June 7, 1966 R. L. HORST 3,255,453
NON-UNIFORM DIELECTRIC TOROIDAL LENSES
Filed March 26, 1963 3 Sheets-Sheet 1

INVENTOR
Robert L. Horst
BY Moore, Hall & Pollock
ATTORNEYS

June 7, 1966   R. L. HORST   3,255,453
NON-UNIFORM DIELECTRIC TOROIDAL LENSES
Filed March 26, 1963   3 Sheets-Sheet 2

INVENTOR.
Robert L. Horst
BY
ATTORNEYS

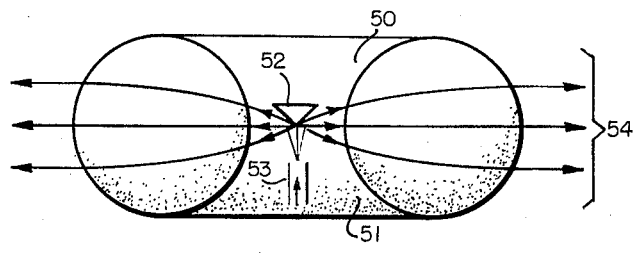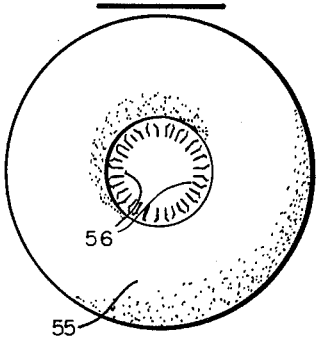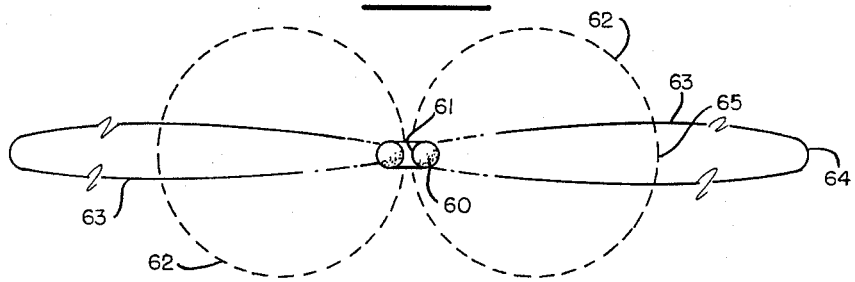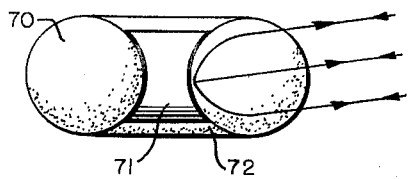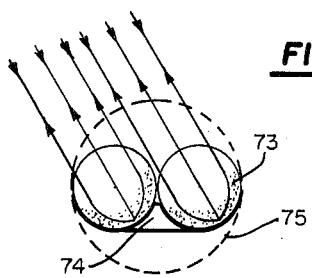

United States Patent Office 3,255,453
Patented June 7, 1966

3,255,453
NON-UNIFORM DIELECTRIC TOROIDAL LENSES
Robert L. Horst, Manheim Township, Lancaster County, Pa., assignor to Armstrong Cork Company, Lancaster, Pa., a corporation of Pennsylvania
Filed Mar. 26, 1963, Ser. No. 268,156
17 Claims. (Cl. 343—754)

The present invention relates to the fabrication of an improved dielectric lens characterized by a dielectric constant and hence a refractive index which varies continuously as a function of the lens coordinates; and is more particularly concerned with a lens of the general type described which is so shaped, both physically, and quasi-optically, as to facilitate its use in the transmission, reception, or reflection of high frequency energy, especially where a scanning technique is to be employed.

Various forms of lenses and antennas have been suggested heretofore for use at high radio frequencies, and particularly at frequencies in the microwave portion of the spectrum. One well known type of antenna comprises, for example, a parabolic reflector lens; and such lenses normally comprise relatively massive structures of parabolic shape associated with an appropriate feed or receptor disposed adjacent the focus of the parabola (parabolic cylinder or paraboloid). When such an installation is to be used in a scanning technique, it is common practice to move the entire parabolic reflector or lens; and, as is well known, such scanning with a massive parabolic structure is normally accompanied by significant mechanical and electrical problems arising primarily from the mass which must thus be physically moved.

In an effort to obviate some of these known problems, it has been suggested that the massive parabolic structure be replaced by a dielectric lens structure again associated with an appropriate feed. Lens structures of this type, suggested heretofore, normally comprise a true or artificial dielectric material shaped in an appropriate two-dimensional or three-dimensional configuration and exhibiting a dielectric gradation in two or more dimensions approximating that contemplated by various workers in the field, e.g., Luneberg, Maxwell, Kelleher, and others. The scanning techniques contemplated with such dielectric lenses normally contemplate that a scanning feed, or feeds, be located adjacent the exterior of the lens. The lens itself may, for example, assume a cylindrical or spherical configuration, in which case, the scanning feed would be positioned adjacent the outer cylindrical or spherical surface of the lens.

In such dielectric lens installations, two types of scanning feeds are normally employed. In one case, the feed mechanism is movably disposed adjacent the external cylindrical or spherical lens surface; and scanning is effected by physically moving the feed element through a path extending around the exterior of the lens. Dielectric lenses of types ordinarily employed in such installations may assume very large dimensions; and the use of a movable feed element in such lenses therefore requires that the feed traverse an extremely long path about the circumference of the lens. This in turn engenders some of the problems which characterized the parabolic lens scanning techniques discussed previously; and the problem has, in such cases, manifested itself in the required movement of a relatively light weight feed element through a very large distance as compared to the aforementioned parabolic lens problems wherein a more massive element was moved through a somewhat smaller distance.

In an effort to obviate even these problems arising from the required physical movement of a feed element, a second type of scanning feed has been suggested for use with dielectric lenses of the types described, i.e., a plurality of fixed position feed elements spaced from one another about the lens periphery, and appropriately energized by differently phased inputs, thereby to effect an electronic scanning operation. While this has obviated the mechanical movement problems described, it has in turn been subject to a different problem. In particular, it has been found that, when plural feed elements are mounted in fixed positions about the exterior of a dielectric lens, the feed element on one side of the lens may block radiation emitting from the feed element on the other side of the lens. Moreover, when used as a receiving element, the feed elements tend to block incoming energy. Thus, while mechanical scanning problems have been obviated, the viewing or effectiveness of the lens has been somewhat restricted.

The present invention, recognizing the advantages of dielectric lenses, is accordingly concerned with improved such lenses which avoid the limitations of lens and feed configurations typical heretofore when such lenses are employed in scanning techniques. In providing for these improvements, the present invention is particularly concerned with a dielectric lens of toroidal configuration adapted to be associated with a feed element or elements located adjacent the center of the torus. The feed element may be movable; but, due to the central location of the feed, 360° scanning can be effected by moving a very light weight feed element through a very small distance. The feed element may, moreover, comprise a plurality of fixed members, again disposed adjacent the center of the toroid, and associated with an appropriate electronic scanning apparatus; and in such cases, unblocked 360° viewing can be achieved when the apparatus is used either to transmit or receive energy, since no lens feed element is located in the path of energy transmitted or received via the lens. The lens of the present invention thus comprises an arrangement highly useful as a secondary radiator in antenna applications, e.g., with a directional primary feed, with a 360° omnidirectional feed, or with an array of circular disposed feeds, etc.; and allows azimuthal scanning without rotation of the secondary radiator, as well as such scanning by feed element phasing without aperture blocking.

As will appear hereinafter, the toroidal mass of the present invention can also be associated with appropriate conductive pieces acting as lens reflectors, rather than being associated with feed elements. When the masses are employed in this alternative manner, the resultant assembly effects directional and performance characteristics previously unobtainable with conventional reflectors or lens reflectors.

It is accordingly an object of the present invention to provide an improved dielectric mass of generally toroidal shape, capable of employment as a secondary radiator or as a lens reflector. The term "toroidal" used hereinafter, and in the appended claims, is intended to mean a shape generated by the rotation of a plane closed curve about an axis; and will be specifically described hereinafter in respect to shapes generated by both circular and semi-circular such curves. The actual shape of the curve may vary, however, as may its position and spacing relative to the axis about which it is rotated; and all of these various different configurations, some of which will be described more specifically hereinafter, are intended to be encompassed within the terms "toroid" and/or "toroidal."

Another object of the present invention resides in the provision of a toroidal dielectric lens exhibiting dielectric gradations in planes passing through the lens axis.

Still another object of the present invention resides in the provision of an improved dielectric lens which can be employed in scanning techniques without being subject to the mechanical movement problems, or to the aperture blocking considerations, which have characterized dielectric lens arrangements heretofore.

Still another object of the present invention resides in the provision of a novel technique for fabricating a substantially toroidal mass of dielectric material capable of being used as a secondary radiator, as a lens reflector, or in other applications.

Another object of the present invention resides in the provision of an improved technique for forming dielectric masses having substantially toroidal configurations; and is more particularly concerned with a modular technique for forming such masses, wherein a smooth and substantially continuous dielectric gradation is achieved in the operative transmission or reception directions of the final mass.

The foregoing objects, advantages, construction and operation of the present invention will become more readily apparent from the following description and accompanying drawings, in which.

FIGURES 5A through 5F inclusive show sectors of various typical toroidal configurations for dielectric masses constructed in accordance with the present invention;

FIGURE 6A is a side view of a lens and appropriate feed mechanism which may be employed in a non-scanning application to achieve an improved directional pattern in altitude;

FIGURE 6B is a top view of a similar such lens with a circularly disposed array of feeds;

FIGURE 7 is a view similar to that of FIGURE 6A illustrating an alternative form of dipole feed which may be employed, and further illustrating the improved directional pattern in altitude achieved by the toroidal lens of the present invention;

FIGURE 8 illustrates the use of a toroidal mass constructed in accordance with the present invention as an azimuth-independent reflector; and FIGURE 9 illustrates the use of a mass constructed in accordance with the present invention as a minimum depth-to-aperture lens reflector.

Figure 1:
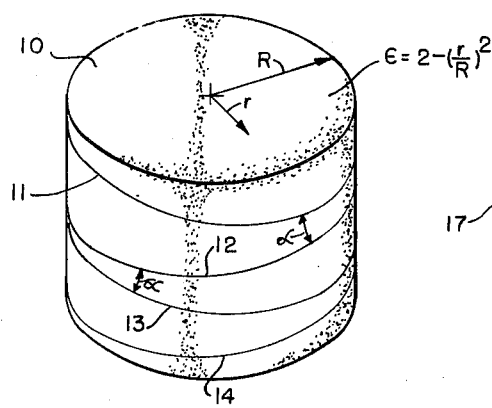
FIGURE 1 is a perspective view of a monolithic dielectric mass cut in appropriate planes to form wedges such as may be employed as modules in a toroidal lens.
Figure 2:
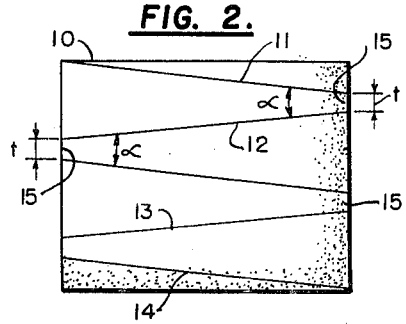
FIGURE 2 is a side view of the structure shown in FIGURE 1, further illustrating the wedge preparation technique of FIGURE 1.

Referring now initially to the several figures, particularly to FIGURES 1 through 3, it will be seen that a toroidal lens constructed in accordance with one embodiment of the present invention may be fabricated by the assembly of a plurality of appropriate wedges or wedge modules prepared from a monolithic substantially cylindrical mass of smoothly graded dielectric material. The starting monolithic mass is identified in FIGURES 1 and 2 as mass 10; and it may initially be prepared by a technique such as has been described in my prior copending application Serial No. 217,751, filed August 17, 1962 for "Cylindrical Dielectric Lens and Method for Forming the Same."

The mass 10 exhibits a continuously and smoothly varying dielectric constant in its radial directions $r$ across the entire radius R of the lens between the lens axis and its outermost periphery. The actual gradation depends upon the type of lens originally formed; and in one typical case, the mass 10 can exhibit a refractive index variation, which may be expressed as a variation in dielectric constant ($\epsilon$) by the equation:

$$\epsilon = 2 - \left(\frac{r}{R}\right)^2$$

where:

$R$ = the starting mass radius,
$r$ = the radial variable; and
$\epsilon$ = the relative dielectric constant of the material corresponding to any particular radial point.

The formula given above is the well known Luneberg gradation; but other formulas may be utilized in accordance with the theories of other workers in the field. In the Luneberg case, the mass exhibits its lowest dielectric constant at its outermost periphery, i.e., a constant of substantially unity; with the dielectric constant smoothly increasing in radial directions, to a maximum constant of 2 at the axial center of the mass.

A mass 10 exhibiting such a continuously varying dielectric constant or refractive index can be formed from, for example, an artificial dielectric material consisting of an array of randomly oriented metallic particles supported by a low density dielectric matrix material. The dielectric constant or refractive index variation is achieved by appropriately controlling the loading concentration of the metallic particles in said low density dielectric material. Thus, the metallic particles may comprise insulated aluminum slivers, preferably of needle shape having a length less than one-eighth wave length. The supporting matrix in turn may take the form of a low loss polystyrene foam similar to commercially available "Armalite," a trademark of the Armstrong Cork Company, Lancaster, Pennsylvania, fabricated from low density polystyrene beads or spheroids, also preferably less than one-eighth wavelength in size. Composite materials of this type simulate a natural dielectric when immersed in an electromagnetic field. In particular, in a dielectric medium submicroscopic dipoles are set up by the impressed field and serve to alter the velocity of propagation of the wave; and in an artificial dielectric material of the type described, this principal effect is achieved macroscopically by the conductive particles, i.e., the randomly oriented metallic slivers of millimetric length act to delay waves of centimetric length (microwave situation).

In my prior copending application Serial No. 217,751 identified previously, I have shown a technique for fabricating a substantially cylindrical monolithic mass of variably loaded true or artificial dielectric materials, e.g., an artificial material such as has been described above, exhibiting a smooth and substantially continuous variation in refractive index in radial directions. A cross feeding system or technique is preferably employed wherein a mass of dielectric beads, interspersed with flakes or slivers of aluminum (whereby the composite mass exhibits a dielectric constant greater than unity) is cross-fed with a lower index dielectric medium, comprising for example plain polystyrene beads identical to those which serve as the vehicle for the metallic slivers. These two flowing streams of dielectric material, respectively having dielectric constants greater than and substantially equal to unity, are fed into a charge box of appropriate geometry (e.g., a substantially cylindrical charge box, in the case of a cylindrical lens such as 10) through specially contoured gates associated respectively with the flowing streams; and the charge box is rotated as the cross-fed material is fed therein. The gate contours assure that the desired continuously varying index, as well as a uniform depth of material is effected in the rotating charge box. A similar cross-feeding technique may be employed to effect a charge of natural dielectric materials (rather than a sliver loaded artificial dielectric material) having the desired continuously varying index. In either case, i.e., using natural or artificial dielectric materials, the refractive index variation is achieved by controlling and varying the loading concentration of the cross-fed materials at various radial positions in the mass.

The substantially smooth lay-up of dielectric material thus effected, having the desired continuous dielectric constant gradation therein, is then fused into a unitary substantially cylindrical mass, e.g., by a steam molding process; and the unit thus produced may then be unmolded and heat-treated for an appropriate extended period of time to effect the removal of all moisture and also to insure dimensional stability in the final device.

The resulting cylindrical unit takes the form shown at 10 in FIGURES 1 and 2; and has a continuously varying dielectric constant in its radial directions (i.e., a continuously varying loading concentration), all as described previously. Such a unit may, therefore, be utilized as a starting mass for the preparation of appropriate modules such as may be employed to fabricate a toroidal structure of the type contemplated by the present invention.

Referring more particularly to FIGURES 1 and 2, it will be seen that the monolithic cylindrical mass 10 exhibiting the previously described continuous radial variation in refractive index, can be sliced along a plurality of planes, such as 11, 12, 13 and 14. These various parting planes 11 through 14 are inclined to one another by an angle α the magnitude of which depends upon the size of, and number of modules desired in, the final toroidal mass. Moreover, each of the various planes 11 through 14 is inclined at an acute angle to the upper and lower planes of the cylindrical starting mass 10 whereby each pair of adjacent planes forms a wedge shaped module extending completely across the starting mass.

It will be further noted that each adjacent pair of planes, such as 11 and 12, extends from one vertical side of the starting mass in converging relationship to one another (by the aforementioned angle α) to the other side of the starting mass 10; and the said other side of the mass 10, at the extremities of the parting planes, defines a chord 15 which may be either of zero length, or which may have some finite length indicated in the drawings as *t*. If two adjacent parting planes such as 11 and 12 meet one another at a side of the starting mass, i.e., the chord is of zero length, the wedge produced is of such shape that, when assembled with other similar such masses, the final toroid has no hole in its center. As the chord length *t* increases, by appropriate selection of the angles of the parting planes, relative to one another, the size of the hole in the center of the final toroid similarly increases. Thus, by appropriate choice of the angle α between adjacent parting planes, and their relation to one another at the chord side of the starting mass, toroids of various appropriate sizes and "hole" configurations can be achieved.

Figure 1A:
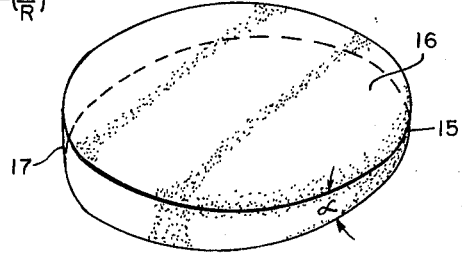
FIGURE 1A is a perspective view of a single wedge formed by the technique illustrated in FIGURE 1.

An individual wedge such as may be produced by the slicing technique shown in FIGURES 1 and 2 has been shown at 16 in FIGURE 1A. It will be appreciated from the foregoing discussion that the wedge 16 comprises a material which exhibits a given predetermined dielectric constant variation (or loading concentration variation), thereacross. Moreover, the wedge 16 comprises a pair of upper and lower planar surfaces angularly inclined to one another by the angle α thereby to produce a final structure having a relatively narrow chord edge 15, of lesser height than the wedge outer edge 17.

The relatively narrow edge 15 in the wedge constitutes a relatively low dielectric constant portion (or relatively low loading concentration portion), of the wedge; and the dielectric gradation in the wedge is such that higher dielectric constants (and higher loading concentrations) appear on the interior of the wedge than appear at its narrow edge. This, indeed, is a characteristic of the wedges shown in FIGURE 1A, but is also a characteristic of the wedge to be described hereinafter in reference to FIGURE 4A; and is to be distinguished from prior techniques employing tapered wedges wherein the narrowest edge of the wedge exhibits the highest dielectric constant therein.

Figure 3A:
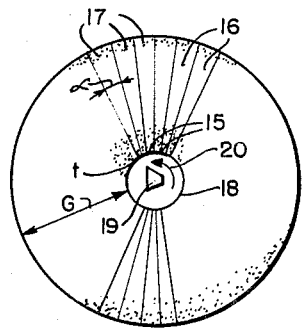
FIGURE 3A is a top view of a toroidal lens assembled from a plurality of wedges of the type shown in FIGURE 1A.
Figure 3B:
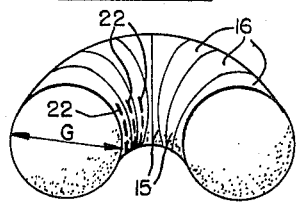
FIGURE 3B is a perspective view of a portion of the lens shown in FIGURE 3A.
Figure 3C:
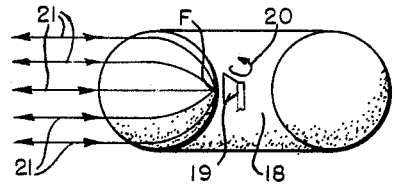
FIGURE 3C is a side cross-sectional view of the structures shown in FIGURES 3A and 3B, further illustrating the disposition and operation of a movable feed element in relation thereto.

Plural wedges of the type shown in FIGURE 1A, formed e.g., from a plurality of starting masses 10, may be assembled in side to side relation to one another in the manner shown in FIGURES 3A and 3B. In such assembly, the various relatively wide edges 17 of the successive wedges appear adjacent the outer side of the assembly, whereas the various thinner chord edges 15 appear at the inner edge of the assembly. The disparity in dimensions between the portions 15 and 17, as well as the angular relation α between the opposite sides of each wedge 16, results therefore in the final assembly being of substantially toroidal shape and defining an inner hole 18, the dimensions of which depend upon the dimensions *t* and α selected during initial wedge preparation.

The various wedges 16 may be retained in their assembled relation (as shown, for example, in FIGURES 3A and 3B) by use of appropriate cement on the adjacent faces of the wedges, or by the application of appropriate tapes across the outer surfaces of the assembly, or by encasing the overall assembly in an appropriate protective shell of plastic material. In any event, the final assembly is of toroidal shape, and defines some desired gradation thereacross, as indicated at G in FIGURES 3A and 3B. This gradation is characterized by a region of highest dielectric constant (or highest loading concentration) at the interior of each wedge, decreasing smoothly (in the Luneberg case) in directions both radially inward and radially outward of said highest constant or highest concentration region, e.g., to a region of minimum constant or minimum concentration adjacent the outermost and/or innermost surfaces of the toroidal mass relative to the axis of the toroid. This gradation is, moreover, achieved in each of the wedges 16, and is therefore symmetrical about the central axis of the toroid. When the original starting mass exhibits a Luneberg gradation, the final toroid can accordingly be treated as a plurality of juxtaposed incremental cylindrical Luneberg lenses; and the smaller the angle α, the more closely does this approximation approach theoretical configuration.

The structure, thus provided, lends itself to a highly improved scanning arrangement. It is thus possible to dispose a feed element 19, e.g., a horn, in the central hole 18 of the toroid (when such a hole is provided); and rotation of horn 19, e.g., as indicated at 20, will cause the feed element 19 to be associated successively with successive ones of the wedges 16, thereby to radiate or receive energy through successive incremental cylindrical Luneberg lenses. The ray paths in such an operation have been depicted in FIGURE 3C at 21; and it will be noted that, for the Luneberg case, the rays meet at a focus F adjacent the inner hole of the toroid and at the phase center of the feed. The transmission of energy in either direction through the toroidal lens may therefore be accomplished without any blocking by the feed element itself; and scanning may moreover be accomplished through 360° by effecting rotation of the feed element about a minor circle comprising the inner hole of the toroid.

The lack of aperture blocking will be further appreciated by reference to FIGURE 3B wherein small dipoles 22 have been depicted to illustrate the arrangement which is employed when fixed feed elements are utilized in an electronic scanning process. Comparison of FIGURES 3B and 3C immediately shows that no one dipole (or feed element) will impair transmission of energy from or to any other dipole or feed element, since the focal surface for the incremental Luneberg lens is located adjacent the central hole of the toroid. Complete 360° scanning may accordingly be readily accomplished.

Figure 4:
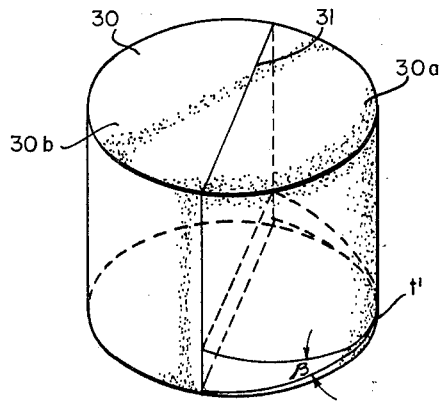
FIGURE 4 illustrates an alternative wedge fabrication technique such as may be employed in the fabrication of a toroidal lens constructed in accordance with another embodiment of the present invention.
Figure 4A:
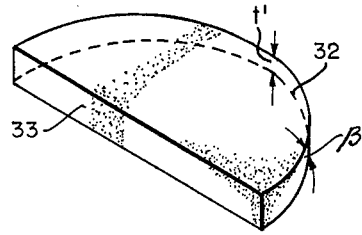
FIGURE 4A is a perspective view of an individual wedge formed by the technique illustrated in FIGURE 4.
Figure 4B:
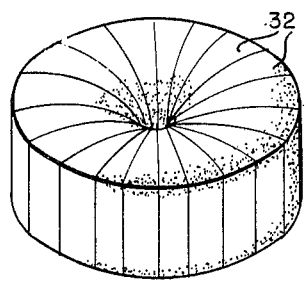
FIGURE 4B is a perspective view of a toroidal lens formed by appropriate assembly of plural wedges such as are shown in FIGURE 4A.

The entire foregoing discussion has made reference to a Luneberg embodiment of the toroidal lens merely by way of example. To emphasize this point, FIGURES 4, 4A and 4B illustrate the fabrication of a toroidal lens which has a Maxwell gradation therein. As was the case in the arrangement of FIGURE 1, a starting cylinder can initially be fabricated by an appropriate cross-feeding technique; and appropriate choice of the cross-feeding gating contours may produce a final monolithic cylinder having a dielectric constant gradation varying in accordance with the theories of Maxwell.

A physically realizable gradation of refractive index ($n$) as a function of the normalized (to unity) radius ($r$) for a Maxwell lens, is given by the equation:

$$n(r) = \frac{2}{1+r^2}$$

A half lens or mass having this grading will effect a collimation of energy radiated from a point source on the curved surface of the lens.

Such a monolithic mass has been depicted in FIGURE 4 at 30. The dielectric gradation of a Maxwell lens is such that the mass 30 may be parted along an axial plane 31 thereby to produce two half-circular cylindrical masses 30a and 30b, each of which is, effectively, a half Maxwell two-dimensional lens. These half cylindrical masses 30a and 30b may thereafter be cut into wedges along parting planes inclined to one another by an appropriate angle $\beta$, and spaced from one another, at the outer surface of each semi-cylindrical mass by an appropriate chord height $t'$. These considerations have been previously discussed in reference to FIGURES 1 and 2; and apply equally to the arrangement of FIGURE 4. The final wedge takes the form shown in FIGURE 4A; and the wedge 32 shown therein is in effect an incremental half Maxwell lens characterized by a planar relatively wide front surface or edge 33, taken from the initial parting plane 31 (see FIGURE 4), and by a narrower curved rear edge taken from the outermost surface of the half cylinder. When plural wedges 32 of the type shown in FIGURE 4A are assembled in the manner shown at FIGURE 4B, the final lens is again of toroidal configuration. In distinction to the lens of FIGURES 3A through 3C, the toroidal lens of FIGURE 4B is electrically (or quasi-optically) characterized by a Maxwell gradation rather than by a Luneberg gradation, and is physically characterized by an outermost substantially cylindrical surface (which may be corrugated or otherwise modified by drilling, etc., to effect a better match at the greater than unity dielectric constant surface) rather than by the arcuately curved outermost surface of the toroidal lens shown in FIGURES 3B and 3C.

Lenses as thus provided by the arrangement of FIGURE 4B can again be associated with appropriate feed elements. If the feed element is movable, it need again move only through a small circle, i.e., it may rotate on its center rather than around the entire outer surface of the lens. Moreover, as in the cases previously discussed, the lens of FIGURE 4B can be associated with a plurality of fixed feed elements mounted in a circular array and appropriately phase fed; and again, no one element can block any other element of the feed array thus provided, whereby the field of view and utility of the lens is substantially increased over phased systems suggested heretofore.

Various of the configurations which may be provided in accordance with the present invention are shown in FIGURES 5A through 5D. By way of example, FIGURE 5A corresponds to the arrangement previously discussed in reference to FIGURES 3A through 3C and comprises a toroidal mass 35 of appropriately graded material, generated by sections 36 of essentially circular cross-section, with the toroidal mass 35 being provided with a central hole 37.

Figure 5A:
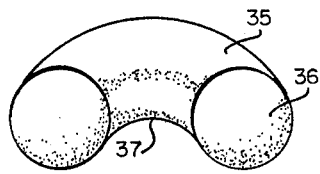
Figure 5B:
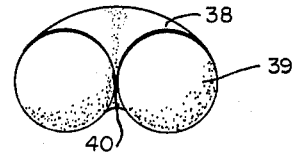
Figure 5C:
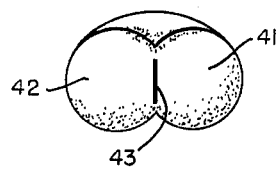

The toroidal mass 38 shown in FIGURE 5B is essentially the same as that shown in FIGURE 5A with the exception that the individual wedges (or sections) 39 are initially formed to have an interior chord of zero height; and as a result, opposed toroid sections meet at a point contact at the center 40 of the mass, i.e., there is no significant "hole" in the center of the toroid. A mass of the type shown in FIGURE 5B may still be used for scanning by providing appropriately phased fixed feed elements in a circular array adjacent the center 40 of the mass, or may be fed along the axial line at a point other than the center in which case a conical field pattern (solid angle less than $2\pi$) exists. The mass of FIGURE 5B can also be utilized for omnidirectional transmission or reception of energy by locating a dipole within the mass adjacent its center 40.

The initial starting mass may, rather than being provided with a conventional Luneberg gradation, also be provided with a modified Luneberg gradation adapted to position the lens focus internally of the lens rather than at its outermost surface. By utilizing a modified Luneberg gradation, a toroid of the type shown in FIGURE 5C may be prepared; and in this case, it will be noted that the opposed wedge sections 41 and 42 meet one another adjacent the center of the mass along an elongated line, rather than at a point contact such as at 40 in FIGURE 5B. A toroidal structure of the type illustrated in FIGURE 5C can be bed by embedding a dipole 43 into the toroidal mass along the common focus of the several wedge sections. It should be noted that when a dipole 43 is so embedded in the arrangement of FIGURE 5C, utilizing a modified Luneberg gradation, the dipole 43 is actually located at a point of dielectric constant greater than unity; and accordingly, the length of the dipole (or the size of the feed element) can be made smaller in the case of FIGURE 5C, than in the cases of FIGURES 5A or 5B wherein the outermost surface of the toroid is of lowest, or substantially unity, dielectric constant.

Figure 5D:
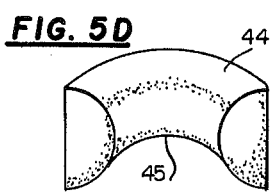
Figure 5E:
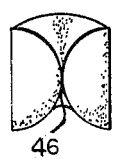
Figure 5F:
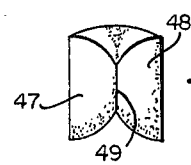

Similar considerations apply in the fabrication of toroids having Maxwell gradations. Thus, FIGURE 5D shows a half Maxwell toroid lens 44 provided with a hole 45 at its center, thereby to correspond generally to the arrangement already described in reference to FIGURE 4B. The central hole can be reduced to a point contact 46 as shown in FIGURE 5E; and FIGURE 5E is therefore, for the Maxwell case, analogous to the Luneberg toroid previously discussed in reference to FIGURE 5B. Modified Maxwell gradients can also be utilized thereby to produce a toroid configuration as shown in FIGURE 5F; and in this case, the opposed half Maxwell lens 47 and 48 meet along an extended line contact 49 adjacent the center of the lens. The arrangement of FIGURE 5F is, therefore, analogous to that previously discussed in reference to FIGURE 5C.

Still other shapes and arrangements of toroidal lenses can be effected, in accordance with the present invention, by appropriate choice of the dielectric gradation and physical shape of the starting mass, and by further appropriate attention to the angles and chord lengths of the wedges produced from such a starting mass. Indeed, the techniques described herein are useful even in the construction of uniform (constant $\epsilon$) lenses of toroidal configurations.

Various arrangements for feeding toroidal lenses of the types contemplated herein will be apparent to those skilled in the art. Three such arrangements have been shown schematically in FIGURES 6A, 6B and 7, respectively. In the arrangement of FIGURE 6A, a toroid lens having wedge sections of Luneberg gradation has been shown at 50; and the toroid of FIGURE 6A is provided with a central hole 51 in which is placed a conical reflector 52. Energy may be directed onto said reflector by means of a horn 53; and in normal course, such energy would, absent the toroid 50, be radiated omni-directionally azimuthwise in a plane. Due to the provision of toroid 50, this omni-directional radiation is made far more directional in altitude; and the energy provided by feed 52, 53, rather than being radiated outward at a relatively large vertical angle, is concentrated in a vertical direction into a more horizontal radiation as shown at 54. A similar ray diagram applies to the arrangement of FIGURE 6B. However, in this case the toroidal lens 55 is associated with a circularly disposed phased array of feed elements 56, which allows azimuthal scanning to be accomplished.

Much the same considerations apply, also, when the toroid is fed by a dipole; and such an arrangement has been shown in FIGURE 7, wherein a Luneberg toroid 60 is fed by a centrally disposed dipole 61. Again, absent the toroid 60, the dipole would tend to radiate in a pattern of the type shown at 62 (without attention to scale). The provision of the toroid 60, however, alters the radiation pattern to that indicated at 63, whereby the energy is again radiated omni-directionally in azimuth, but with much higher directionality in altitude. As a result, the systems of FIGURES 6A, 6B and 7 all produce a plane of radiation, but one which is much more limited in altitude than would be the case absent the toroid. The provision of the toroid thus makes the radiation more directional in altitude and simultaneously increases the range of radiation over what could be effected by the primary feed alone. The increase in range is indicated at 64 in FIGURE 7, as compared with the dipole range indicated at 65.

While the preceding discussion has concerned itself with the use of toroidal masses in fed lens applications, it should be noted that the masses of the present invention also find utility as lens reflectors. In these latter arrangements, the toroidal masses may be associated with appropriate conductive pieces whereby energy incident on the mass is reflected back toward the source of such energy. One possible arrangement operating in this manner is shown in FIGURE 8, wherein a Luneberg toroid 70 is provided adjacent its center with a conductive sleeve 71 conforming in shape to the central surface 72 of the toroid. Energy coming from any direction and incident on the dielectric toroid 70 is brought to a focus at central surface 72, adjacent the central hole of the toroid, by normal action of the Luneberg gradation; and is then reflected by the conductive piece 71 back through the lens toward the source of the radiation. Such an arrangement can be used in buoy structures, as a radar reflector, and in many other environments known to those skilled in the art.

The actual shape and position of the conductive piece may be varied, depending upon the particular application to which the reflector is put. Thus, in the arrangement of FIGURE 9, an alternative structure is shown wherein a Luneberg toroid 73 is associated with a conductive cap 74 covering the lowermost portion of the toroid and portions thereof adjacent its center. Such an arrangement acts to reflect energy upwardly, when the incident energy is initially directed downward (and, therefore, finds use, for example, in structures which are positioned below a source of radiation). An arrangement of the type shown in FIGURE 9 may, for example, be employed as a safety device on life boats or the like and would reflect energy back to searching aircraft. Similarly, by providing the toroid with a central hole, the reflector structure shown in FIGURE 9 may be utilized as a life preserver to support a person in the water while simultaneously acting as a reflector which radiates energy back to a searching craft. This life preserver application for the arrangement of FIGURE 9, while especially feasible since the foamed dielectric material comprising the toroid 73 has a density much less than that of water, whereby the structure is highly buoyant, is merely an example of the multitude of applications for toroidally configured reflective devices.

FIGURE 9 illustrates another advantage for the toroid structure of the present invention, when employed as a radar reflector or lens. Thus, considering the specific reflector application shown in FIGURE 9, it should be noted that similar axial radiation reflector characteristics could be achieved by providing a sphere, shown in dotted line at 75, having its lower surface covered with a conductive piece or cap of hemispherical configuration. The reflection characteristics actually shown in FIGURE 9, and provided by the structure 73–74, requires, however, a far smaller volume of dielectric material than would be required to effect equivalent reflection patterns by such a sphere 75. To illustrate this point, the toroid structure 73 has been depicted within the dotted sphere 75, thereby to establish that the same axial performance is achieved in a much smaller structure.

While I have thus described preferred embodiments of the present invention, many variations will be suggested to those skilled in the art. For example, while most applications of the toroidally configured secondary radiators discussed herein considered centrally located primary feed antennas, an analogous situation could be developed for antenna feeds located along the axial line at points other than the center. Planar field patterns then become conical field patterns of solid angle less than $2\pi$, which may or may not contain a "cone-of-silence," depending upon the feed and lens geometries and relative positions. Further variations may include conductive surfaces at appropriate interfaces to effect beam-shaping and, hence, create radiation pattern changes. It must, therefore, be understood that the foregoing description should be considered as illustrative only of the present invention and not limitative thereof. All such variations and modifications as are in accord with the principles described are meant to fall within the scope of the appended claims.

Having thus described my invention, I claim:

1. A microwave electro-magnetic radiation energy refracting device comprising a toroidally shaped mass of dielectric material exhibiting a smoothly varying dielectric constant between the outermost surface of said mass and points interior of said mass, said points interior of said mass having a higher dielectric constant than said outermost surface of said mass, said toroidally shaped mass being adapted to refract said energy in a predetermined pattern between diametrically opposed regions of a cross-sectional area of said toroidal mass.

2. A plane wave focusing lens comprising a toroidal shaped substantially solid mass of dielectric material the outer surface of which is circularly symmetrical about a central axis, said outer surface of said mass being shaped to define a reentrant portion adjacent said central axis, the interior portions of said mass exhibiting a dielectric constant which increases and subsequently decreases in directions outward of said reentrant portion to refract energy passing through said lens and to define a focus of energy adjacent said reentrant portion for energy passing through said dielectric material toward and away from said central axis.

3. The structure of claim 2 including energy feeding means disposed adjacent the reentrant portion of said mass for feeding energy from a position adjacent said central axis through said toroidally shaped mass.

4. A plane wave focusing lens comprising a substantially solid mass of dielectric material having a toroidal configuration generated about a central axis, said mass having a predetermined variation in dielectric constant between interior portions of said mass and the outermost periphery thereof, the dielectric constant of said mass adjacent the interior portions of said mass being higher than the dielectric constant of said mass at points closely adjacent said central axis and higher than the dielectric constant of said mass at points on the outermost periphery of said mass displaced from said central axis.

5. A microwave lens comprising a toroidally shaped substantially solid mass of dielectric material, the outer surface of said toroidal mass having a dielectric constant which is lower than the dielectric constant of interior portions of said toroidal mass, cross sections of said toroidal mass passing through said central axis and located to one side of said central axis exhibiting a smoothly decreasing dielectric constant between interior portions of each such cross section and the outer surface of each such cross section to refract energy passing through any such cross section of said lens and to bring said energy substantially to a focus.

6. The structure of claim 5 including energy reflective means covering a portion of the outer surface of said mass adjacent said focus.

7. A three-dimensional dielectric mass of substantially toroidal configuration, said mass comprising a matrix of substantially constant index dielectric material supporting a randomly oriented array of sliver-like metallic particles therein, the shape of said mass including a reentrant portion adjacent the center thereof, the concentration of said metallic particles in said matrix increasing and thereafter decreasing smoothly in directions outward of said reentrant portion between said reentrant portion and the outermost portion of said mass.

8. The mass of claim 7 wherein said reentrant portion comprises a substantially circular hole at the center of said mass.

9. The mass of claim 7 wherein said reentrant portion comprises a substantially point contact between portions of said mass disposed on opposite sides of the center thereof.

10. The mass of claim 7 wherein said reentrant portion comprises a substantially line contact between portions of said mass disposed on opposite sides of the center thereof.

11. The mass of claim 7 wherein said mass includes portions of substantially circular cross-section disposed on opposite sides of the center thereof.

12. The structure of claim 7 wherein said mass includes portions of substantially semi-circular cross-section disposed on opposite sides of the center thereof.

13. A toroidal mass of dielectric material comprising a plurality of tapered wedge modules each of which has a relatively narrow edge and a wider edge, each of said wedges having a predetermined lowest dielectric constant adjacent its narrow edge, and each of said wedges exhibiting a dielectric gradation, including dielectric constants greater than said lowest dielectric constant, in directions away from said narrow edge toward said wider edge, said tapered wedge modules being positioned in side to side relation to one another about a central axis, the lowest dielectric constant narrow edges of said modules all being positioned adjacent said central axis, and said wider edges of said modules being positioned radially outward of said narrow edges relative to said central axis.

14. A toroidally shaped mass of dielectric material comprising a plurality of wedges of dielectric material, each of said wedges having a relatively wide edge and a relatively narrow edge, the relatively narrow edges of each of said wedges being at least in part of curved configuration, said wedges each having their relatively wide edge and their relatively narrow edge interconnected by planar surfaces inclined to one another, said wedges being disposed in juxtaposed side to side relation to one another with the curved relatively narrow edges of all said wedges being disposed adjacent the center of said toroidally shaped mass, each of said wedges exhibiting a dielectric gradation in directions generally parallel to the planar surfaces thereof.

15. A mass of dielectric material comprising a plurality of tapered wedges disposed in side to side relation to one another about a central axis, each of said wedges having a relatively narrow edge disposed adjacent said central axis and a wider edge disposed radially outward of said central axis, each of said wedges exhibiting a smoothly varying dielectric constant between its relatively narrow and wider edges with the dielectric constant of each wedge adjacent its relatively narrow edge being lower than the dielectric constant at interior portions of said wedge located radially outward of said relatively narrow edge.

16. A toroidally shaped mass of dielectric material, said mass comprising a plurality of similar lens modules positioned in juxtaposed relation to one another about a central axis, each of said modules having a dielectric gradation therein characterized by a highest dielectric constant at a position interior of said module decreasing in directions both radially inward and radially outward of said interior position.

17. The structure of claim 16 wherein each of said modules has a smaller dimension, in directions parallel to said central axis, at a position adjacent said central axis than at positions radially outward of said central axis.

References Cited by the Examiner

UNITED STATES PATENTS

| | | |
|---|---|---|
| 2,737,503 | 3/1956 | Sprague et al. |
| 2,761,141 | 8/1956 | Strandberg _____ 343—911 |
| 2,886,788 | 5/1959 | Cushman et al. _____ 333—78 |
| 3,001,267 | 9/1961 | Heibel et al. _____ 29—155.5 |
| 3,015,102 | 12/1961 | Crane et al. _____ 343—911 |
| 3,067,420 | 12/1962 | Jones _____ 343—701 |
| 3,082,510 | 3/1963 | Kelly et al. _____ 29—155.5 |

HERMAN KARL SAALBACH, *Primary Examiner.*

ELI LIEBERMAN, W. K. TAYLOR, P. GENSLER,
*Assistant Examiners.*